Patented Feb. 9, 1932

1,844,306

UNITED STATES PATENT OFFICE

EVART VELIE WILLIAMS, OF CHICAGO, ILLINOIS

VULCANIZABLE RUBBER COMPOUND

No Drawing.    Application filed June 27, 1931.  Serial No. 547,449.

The object of my invention is the production of a vulcanized rubber containing a filler material to which the vulcanized rubber will adhere, thus producing a stronger rubber than vulcanized rubber containing a filler to which the vulcanized rubber does not adhere.

I find vulcanized rubber will adhere to the tri-oxide of bismuth. I do not restrict myself to any particular vulcanizing agent. Good results may be obtained with a considerable variation in the amount of the tri-oxide of bismuth that is used and I do not restrict myself to an exact proportion of these ingredients.

Where it is desired to add weight to the vulcanized rubber article I prefer to make a composition of tri-oxide of bismuth, a vulcanizing agent and rubber.

The more tri-oxide of bismuth is added the greater the weight of the product, but when a very large proportion of tri-oxide of bismuth is used finally an undesirable brittleness ensues. Good results may be obtained with this formula:—tri-oxide of bismuth 4 parts and vulcanizable rubber compound 1 part.

I claim:

A composition consisting of tri-oxide of bismuth, rubber and a vulcanizing agent.

EVART VELIE WILLIAMS.